Jan. 5, 1932.   H. T. HERR   1,839,921
MULTIPLE CONTROL FOR DIESEL ENGINE UNITS
Filed April 19, 1928    11 Sheets-Sheet 1

WITNESS
E. Lutz

INVENTOR
H.T.Herr
BY
A. B. Rivers
ATTORNEY

Jan. 5, 1932.  H. T. HERR  1,839,921
MULTIPLE CONTROL FOR DIESEL ENGINE UNITS
Filed April 19, 1928   11 Sheets-Sheet 2

INVENTOR
H.T. Herr
BY
*A. B. Reaves*
ATTORNEY

Jan. 5, 1932.  H. T. HERR  1,839,921
MULTIPLE CONTROL FOR DIESEL ENGINE UNITS
Filed April 19, 1928  11 Sheets-Sheet 3

WITNESS
E. Lutz

INVENTOR
H.T.Herr
BY
a.B.Rivers
ATTORNEY

Jan. 5, 1932.    H. T. HERR    1,839,921
MULTIPLE CONTROL FOR DIESEL ENGINE UNITS
Filed April 19, 1928    11 Sheets-Sheet 4

WITNESS
E. Lutz

INVENTOR
H.T. Herr
BY
a. B. Reuvis
ATTORNEY

Jan. 5, 1932. H. T. HERR 1,839,921
MULTIPLE CONTROL FOR DIESEL ENGINE UNITS
Filed April 19, 1928 11 Sheets-Sheet 5
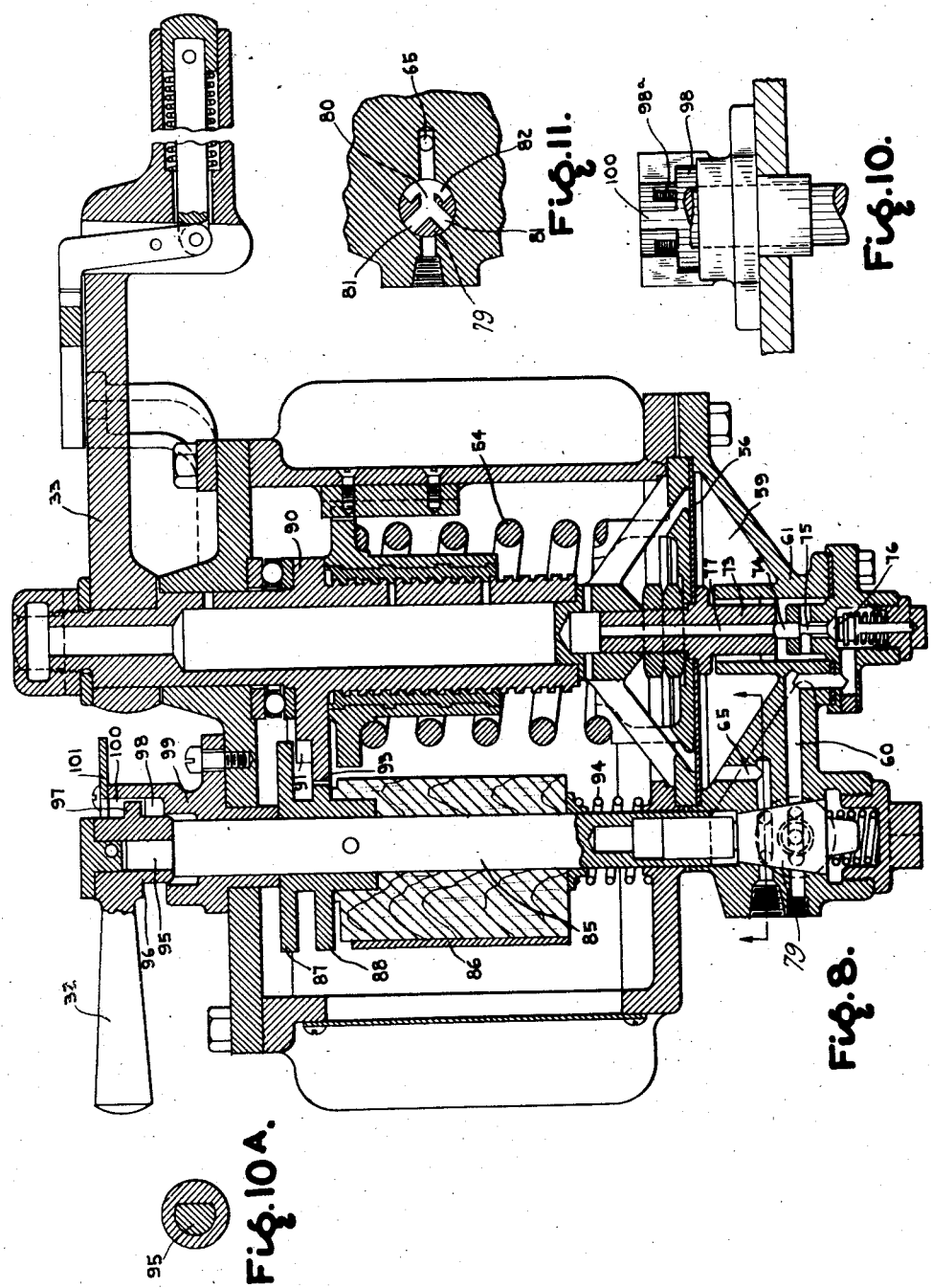
INVENTOR
H.T. Herr Jan. 5, 1932.     H. T. HERR     1,839,921
MULTIPLE CONTROL FOR DIESEL ENGINE UNITS
Filed April 19, 1928     11 Sheets-Sheet 6

WITNESS
E. Lutz

INVENTOR
H. T. Herr
BY
A. B. Reavis
ATTORNEY

Jan. 5, 1932. H. T. HERR 1,839,921
MULTIPLE CONTROL FOR DIESEL ENGINE UNITS
Filed April 19, 1928 11 Sheets-Sheet 10
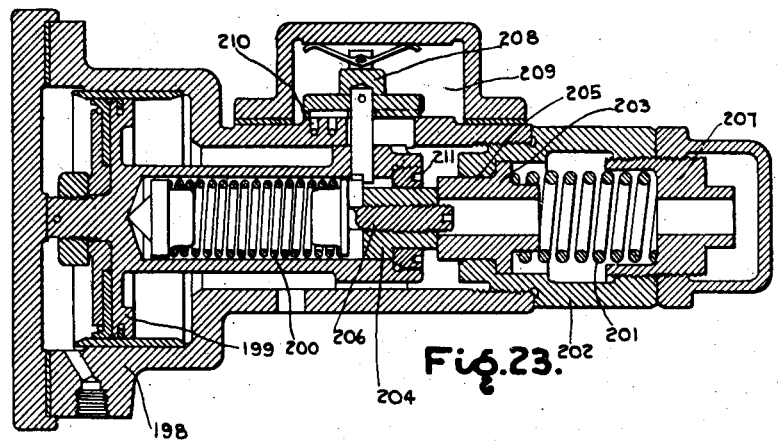
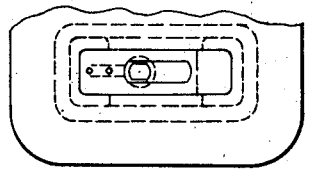
Fig.24.
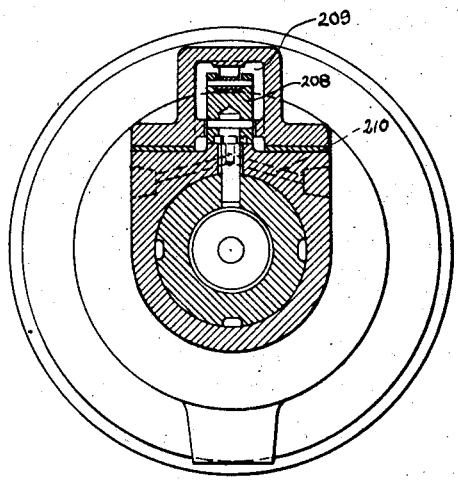
Fig.25.
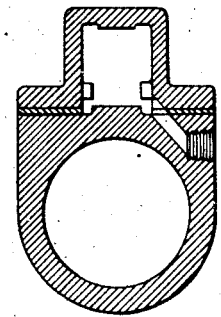
Fig.26.
WITNESS
E. Lutz
INVENTOR
H.T.Herr
BY
a. B. Purvis
ATTORNEY Jan. 5, 1932.  H. T. HERR  1,839,921
MULTIPLE CONTROL FOR DIESEL ENGINE UNITS
Filed April 19, 1928  11 Sheets-Sheet 11

WITNESS
E. Lutz

INVENTOR
H.T.Herr
BY
a.B.Reaves
ATTORNEY

Patented Jan. 5, 1932

1,839,921

UNITED STATES PATENT OFFICE

HERBERT T. HERR, OF MERION, PENNSYLVANIA, ASSIGNOR TO WESTINGHOUSE ELECTRIC & MANUFACTURING COMPANY, A CORPORATION OF PENNSYLVANIA

MULTIPLE CONTROL FOR DIESEL ENGINE UNITS

Application filed April 19, 1928. Serial No. 271,303.

My invention relates to the control of individual or collective units, for example, railway vehicles, operated from a single control station, such as would be required in the operation of one or more internal combustion engine or Diesel engine electric locomotives, and it has for an object to provide apparatus of this character together with a control system therefor which includes one or more controllers capable of operation to control both the engine speed as well as the engine-driven transmission means.

A further object of my invention is to provide one or more prime movers connected to driven devices by suitable transmission means together with a control system embodying one or more controllers, which are operative, one at a time, to control the speed of each prime mover, as well as the transmission means between the prime movers and the driven devices.

A further object of my invention is to provide a control system embodying an energy source and a control line wherein the energy received from the source may have its intensity varied as desired by the operation of a suitable controller.

It is old in the art to employ Diesel or internal combustion engines as prime movers for locomotives and to connect the engines to the traction wheels by means of electric propulsion means. In accordance with my invention, it is a further object to provide a control system for apparatus of this character such that the propulsion means, as well as the speed of the engine, may be controlled from a common point on the locomotive. A more particular object of my invention is to provide such a system that it may be employed with a plurality of locomotives coupled together so that the prime mover, for example, a Diesel engine, on each locomotive, as well as the electric propulsion means, may be controlled in a multiple unit manner from any one of a plurality of control points. Multiple unit control of electric locomotives is well known in the art and the present invention is to be distinguished therefrom in that I not only provide for multiple unit control of the electrical apparatus, but also the prime movers, for example, Diesel engines.

More specifically, each unit comprises a railway vehicle structure having mounted thereon at least one engine, preferably of the Diesel type, driving a generator, which, in turn, is connected to motors for the traction wheels. The electrical connections between the generator and the motors preferably embody means whereby the motors may be operated forwardly or reversely either in series or in parallel. The engine is equipped with means for changing its speed. Each vehicle structure is provided with one or more control stations from any one of which the control system may be operated to control the engine speed as well as the character of the electrical connections; and the arrangement is such that a plurality of units or vehicles may be couped together and all of the engines and the electric propulsion means subjected to multiple unit control from a desired point or station. Also each control station is preferably provided with means whereby one or more of the engines may be rendered ineffective. Hence, it is a more particular object of my invention to provide apparatus of this character so that the units or vehicles will be controlled in the manner stated either individually or collectively.

In the operation of a Diesel electrical locomotive, it is necessary to provide for variation in speed of the Diesel engine in order that the traction motors may operate at constant torque and at variable speeds in driving the locomotive. Also, the low or idling speed for the Diesel engine is so chosen that danger of stoppage is reduced to a minimum. Therefore, I provide each engine with a governor having means for adjusting its speed range together with a controlling system whereby the governors of the engines may be adjusted. A more particular object of my invention, therefore, is to provide, in connection with one or more engines of this character, equipped with speed changer governors, a control system embodying an energy source and a control line for supplying energy to the speed changers to operate the latter in accordance with the intensity of supplied energy together with controlling means to control the intensity of energy supplied to the line.

These and other objects are effected by my invention, as will be apparent from the following description and claims taken in connection with the accompanying drawings, forming a part of this application, in which:

Fig. 8 is a vertical sectional view of a master controller in which the main electric control elements are not embodied;

Fig. 10 is a detail view of the guide slot for the reversing lever;

Fig. 10A is a sectional view showing the connection of the reversing lever with respect to its shaft;

Fig. 11 is a sectional view through the air control valve;

Figure 22:
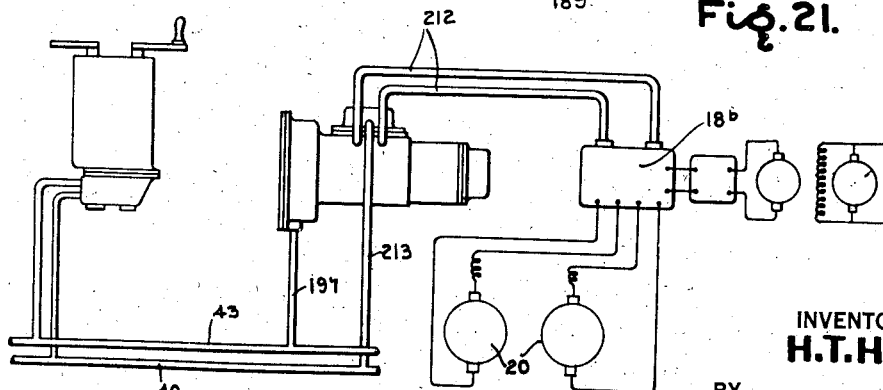
Fig. 22 is a diagrammatic view of my control system including a modified form of pneumatic relay control.
Figure 27:
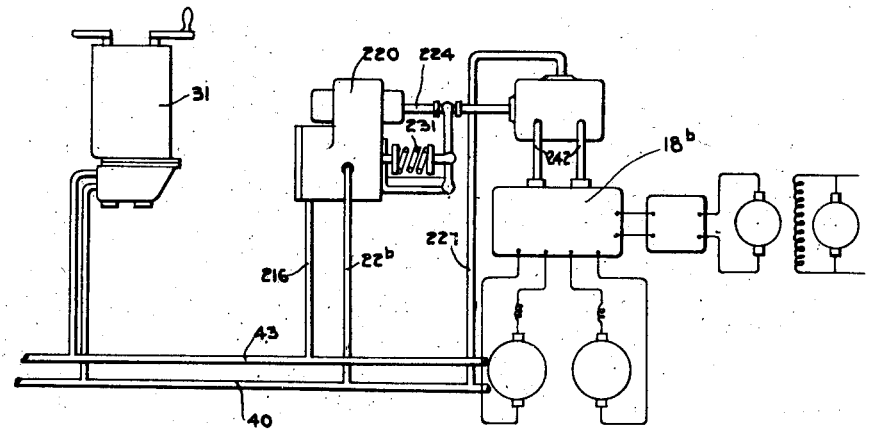
Figure 28:
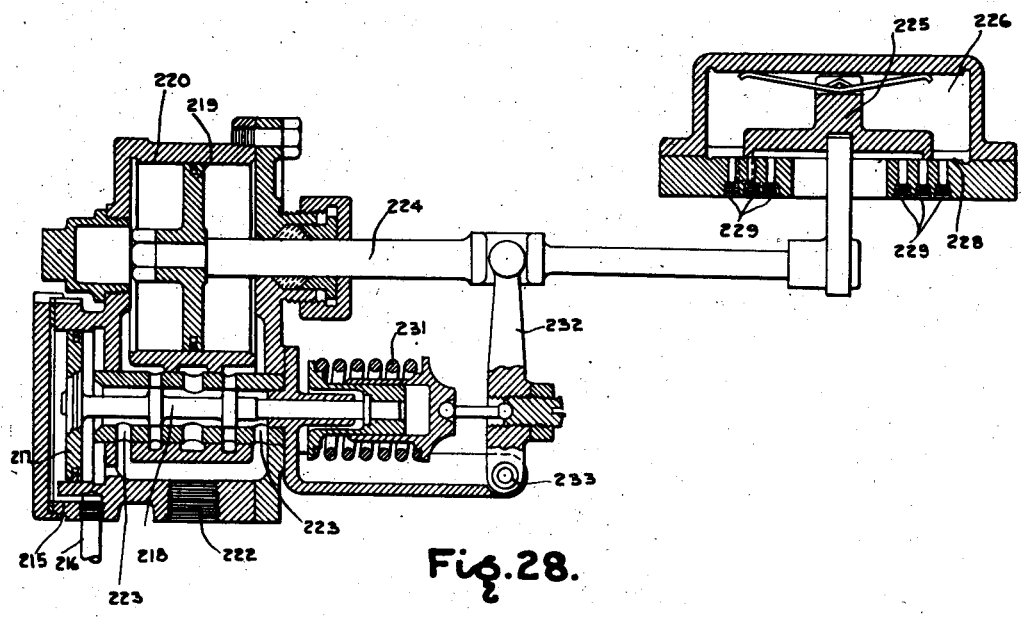

Figs. 23 to 26, inclusive, are detail views pertaining to the form shown in Fig. 22;

Fig. 27 is a diagrammatic view of my improved control system in incorporating a further modified form of pneumatic relay control device; and Fig. 28 is a longitudinal sectional view of the pneumatic control.

Figure 1:
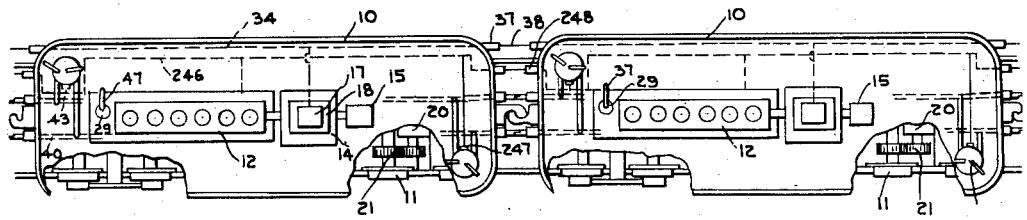
Fig. 1 is a fragmentary plan view of a plurality of coupled railway vehicles having my improved propulsion and control equipment applied thereto.
Figure 2:
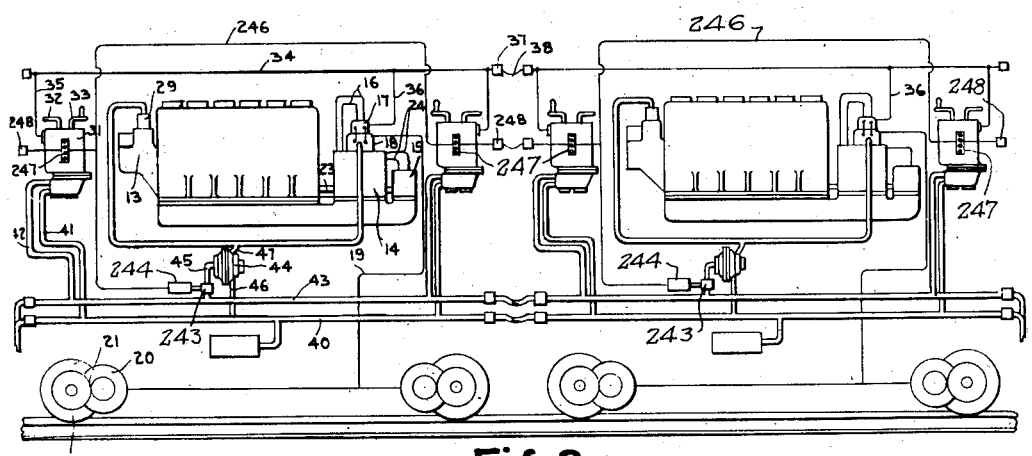
Fig. 2 is a diagrammatic view of control and propulsion equipment for a plurality of railway vehicles.

Referring now to the drawings more in detail, in Figs. 1 and 2, I show diagrammatically a plurality of coupled railway vehicles 10 having traction wheels 11. Each vehicle has mounted thereon a prime mover 12, for example, an internal combustion engine and each engine is provided with speed control mechanism 13. The prime mover 12 of each vehicle is connected to its traction wheels 11 by reversible and variable speed mechanism.

In the drawings, I show the transmission mechanism as preferably comprised by a generator 14 driven by each engine or prime mover 12, the engine or prime mover also driving an exciter 15 for the generator 14. The generator 14 supplies current, for example, through leads 16 to the reversing switch 17; and, from the latter current passes through the series-parallel switch 18, which supplies current through suitable circuits incorporated in the cables 19 to the motors 20 connected by gearing 21 to the traction wheels 11.

As specific characteristics of the electric propulsion means do not constitute parts of my invention, the generator 14, the exciter 15 and the motors 20, as well as the reversing and the series-parallel switches, are shown more or less diagrammatically, it being understood that these parts or elements are of standard construction, and are well known in the art. In order to avoid obscuring essential features of my invention electrical circuits are shown in most instances by cables. Reference has already been made to the cables 19 including suitable circuits for providing series or parallel operation of the traction motors 20. Other circuits are included in cables as will be hereinafter pointed out.

Referring to Figs. 2, 4, 5 and 16, the prime mover 12 has its crank shaft 23 directly connected to the rotor of the generator 14 and to the rotor of the exciter 15, the exciter being provided with leads 24 for supplying current to the field 25 for the generator 14. The generator is provided with supply leads 26 connected to the reversing switch 17, the latter being provided with leads 27 for connecting the latter to the series-parallel switch 18, and the series-parallel switch 18 is provided with outlet leads 28, for the traction motors 20. By suitably controlling the switch 17, the direction of motion of the motors 20 may be changed. Also, by controlling the series-parallel switch 18, the motors 20 may be caused to operate in either direction in series or in parallel. As already pointed out, the prime mover, or Diesel engine, 12 is provided with speed changing or adjusting mechanism 13, such mechanism being particularly shown, as hereinafter pointed out, as speed changer governor mechanism, and this mechanism includes a controlling element or pressure-responsive device 29. My invention relates to a system of control whereby the controlling elements 29 of the engines, the reversing switches 17, and the series-parallel switches 18 may be suitably controlled from any one of a number of control points distributed along one or more coupled railway vehicles.

Referring now to the controlling system, this preferably includes a plurality of master controllers 31 each having a reversing control element 32 and a main control element 33 adapted to be manually actuated. When a reversing control element 32 is operated, the reversing switches 17 are controlled to secure forward or reverse operation of the motors. On the other hand, when a control element 33 is actuated, the speed control mechanisms 13 of the prime movers 12, as well as the series-parallel switches 18, are controlled. In accordance with my invention, each controller 31 embodies means rendered effective by operation of a control element 33, whereby energy may pass from a suitable source to a control line, the intensity of energy in the control line being at all times a function of the position of adjustment of a control member 33.

The control line, which is responsive to adjustment of any one of the control members 33, is arranged to control all of the speed changing devices of the prime movers 12, so that all of the prime movers have their speeds controlled by and are responsive to adjustment of any one of the manually controlled members 33. In addition, the series-parallel switches 18 are responsive to movement of any one of the manually controlled members 33 so that the traction motors 20 of each vehicle may be caused to operate in series or in parallel in response to adjustment of a control member 33.

In addition to the operations brought about by adjustment of the manually controlled members 32 and 33, as just pointed out, interlocking mechanism is incorporated between the control members 32 and 33 of each master controller 31, this interlocking mechanism preventing movement of the reversing control members 32, unless the main control member 33 is in idling or "off" position and preventing movement of the control members 33 unless the member 32 is in "forward" or "back" position.

In order that the reversing elements 32 may actuate the reversing switches 17, I provide suitable circuits indicated as incorporated in the cable 34 having connecting cables 35 going to each master controller 31 and connecting cables 36 going to the reversing switches 17. The cables 34 are provided with connections 37 whereby the cables 34 of a pair of vehicles may be connected by suitable connectors 38, as shown in Fig. 1. It will be understood that the cables, couplings and connectors just referred to include suitable electric circuits such that all of the reversing switches 17 may be actuated upon movement of a single reversing lever 32.

Referring now to the apparatus more in detail for controlling the engine speed and the series and parallel switches 18, each master controller 31 is provided with means for controlling the passage of air from a high-pressure line 40 through a connection 41 to the connection 42 of a control line 43, the apparatus in question serving not only to control the passage of air from the connection 41 to the connection 42 but also to control the intensity of pressure in the connection 42 and the control line 43 and maintain such intensity of pressure in accordance with the position to which any one of the main control elements or levers 33 may have been adjusted. Air may be supplied by a control line 43 directly to the control devices 29 of the speed changing mechanism 13 of the engines 12 or it may be supplied indirectly. With one or two coupled vehicles, the direct supply of air to the speed changing devices is effective; however, with several coupled vehicles, it is preferable to employ relays so as to minimize the flow of air through the control line 43, such relays being responsive to the pressure in the control line 43 and serving to supply air from the high-pressure line 40 at the same pressure to the control devices 29.

Figure 4:
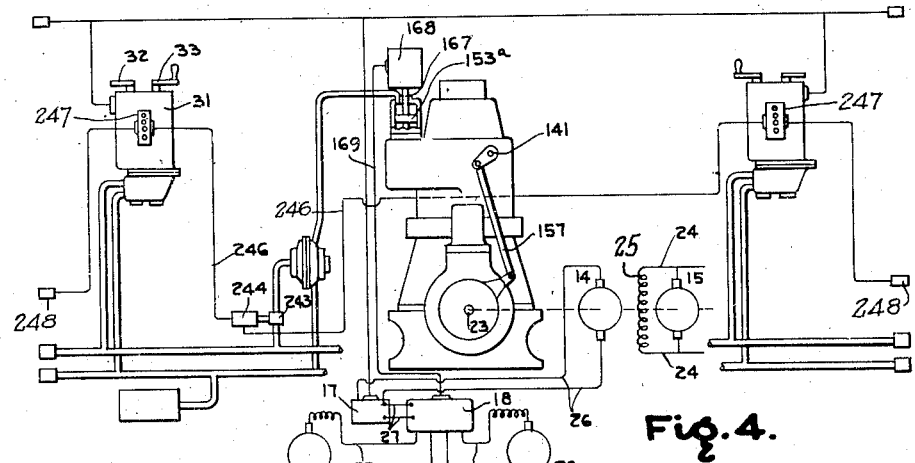
Fig. 4 is a diagrammatic view showing the electric controller operated from the governor.
Figure 5:
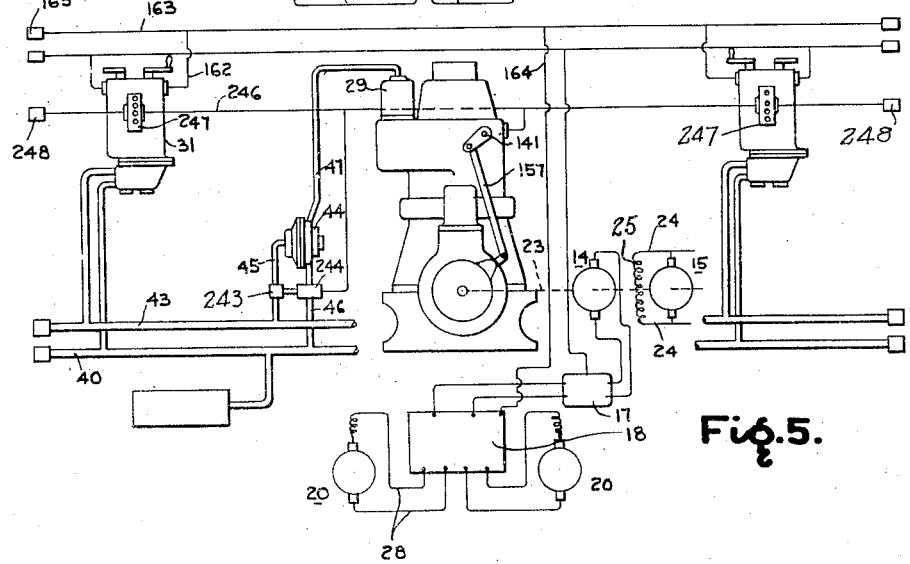
Fig. 5 is a diagrammatic view showing an arrangement wherein the electric controller is embodied in the master controller.
Figure 16:
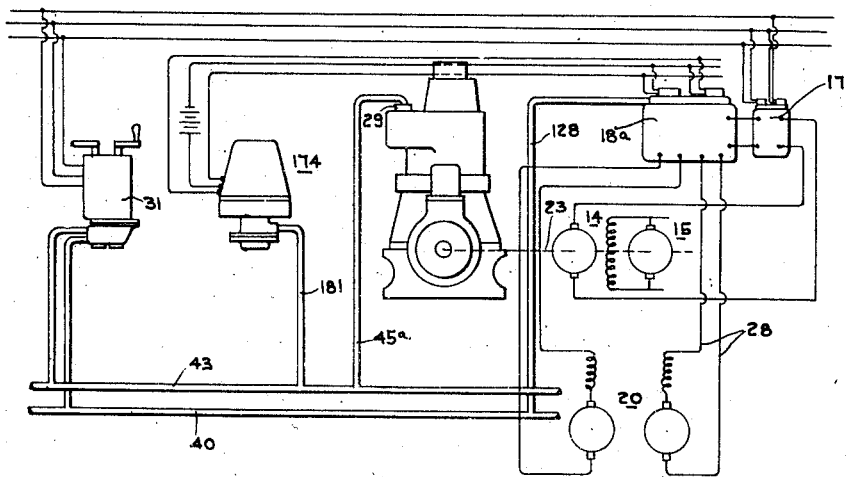
Fig. 16 is a diagrammatic view showing a pneumatically operated electric controller.

In Figs. 2, 4 and 5, I show relays 44 having connections 45 with the control line 43, a connection 46 leading to the high-pressure line 40, and a connection 47 leading to the pressure-responsive device 29 of the engine governor. With a change in pressure in the control line 43, the relay 44 is actuated to cause air to pass from the high-pressure line 40, through the connection 46, and through the connection 47 to the pressure-responsive device 29 in order to supply air to the latter at the same pressure existing in the control line 43. If air is supplied directly from the control line 43, as shown in Fig. 16, the connections 45ª would go directly to the pressure-responsive devices 29. Hence, it will be seen that I provide a control line wherein pressure of air is maintained proportionally to the position to which any one of the master control levers 33 is adjusted and the consequent change in pressure in the control line 43 serves to change the speed of all of the prime movers operatively associated with the control line. Also, as will be pointed out, the series-parallel switches 18 are controlled, either directly from the main control lever 33 or indirectly through the pressure of air in the control line 43.

Figure 6:
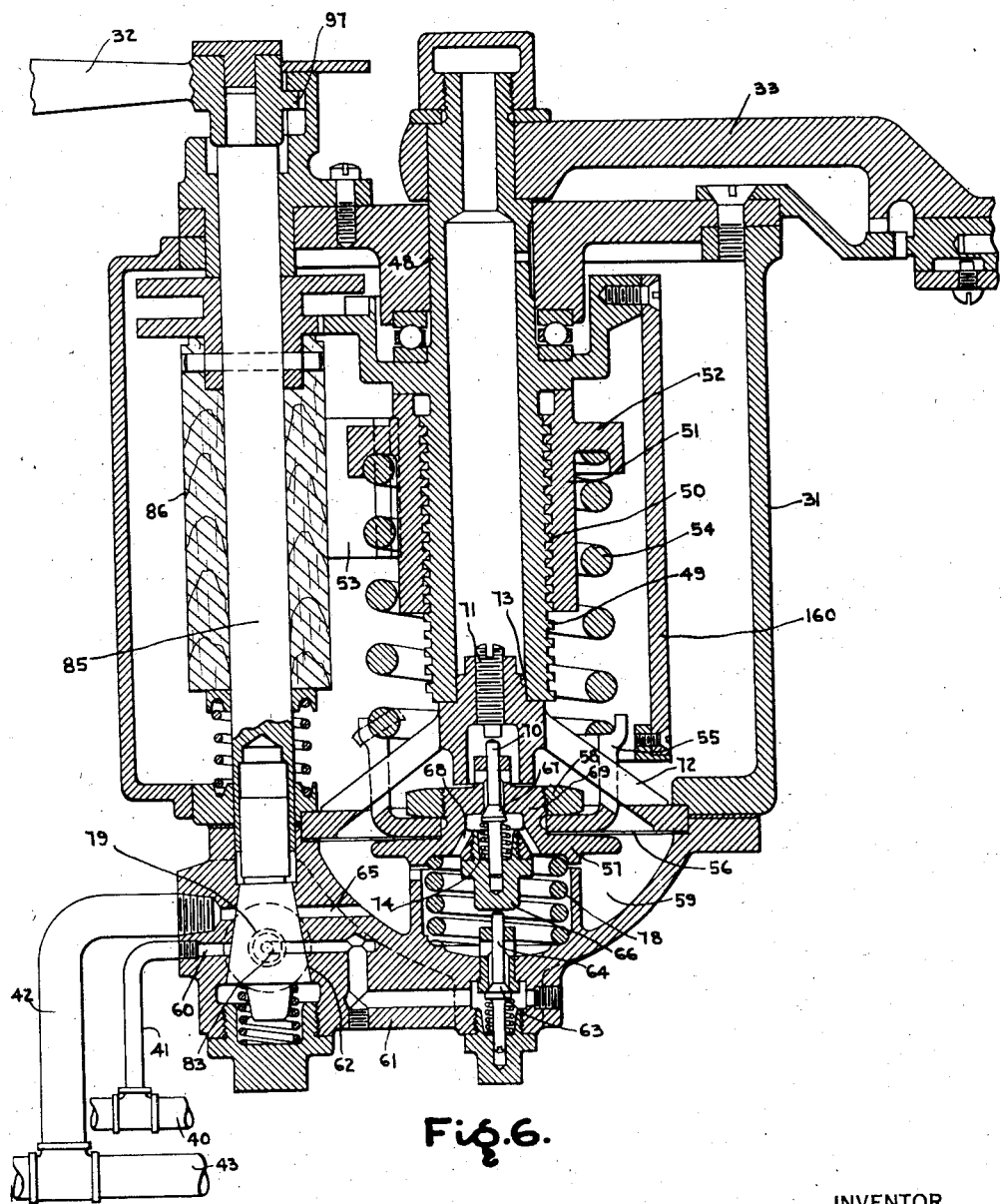
Fig. 6 is a sectional view of a master controller embodying an electric controller.

Referring now more particularly to the apparatus for securing the graduated control of the pressure of air in the control line 43, in Fig. 6, I show a master controller 31 having a control lever 33 which is connected to the upper end of a spindle 48, the spindle having threads 49 which engage threads 50 carried by a follower nut member 51, the latter having a flange 52 at its upper end arranged to engage a spline member 53 to prevent rotation of the follower nut member 51 when the spindle 48 is turned by the control lever 33. A spring 54 has its upper end abutting underneath the flange 52 and its lower end connected to a supporting member 55 being clamped in place with respect to a diaphragm 56 by a valve housing 57 and a nut 58. Hence, it will be seen, that the pressure of the spring 54 is transmitted through the support 55 to the upper surface of the diaphragm 56.

The diaphragm 56 constitutes a closure for the air chamber 59, this chamber being arranged to communicate through the connections 42 with the control line 43 so that the same pressure exists in the chamber 59 of a master controller as exists in the control line 43. Air is supplied from the high-pressure line 40 through a connection 41 and a passage 60 formed in the housing construction 61 providing said chamber 59. The passage 60 is intersected by a valve seat 62 and leads to a spring-pressed check valve 63 for controlling the passage of air from the passage 60 to the chamber 59. The valve 63 closes in the direction of flow of air through the passage 60 and it has a stem 64 extending upwardly into the chamber 59 for operation in the manner to be immediately pointed out. The housing construction 61 is also provided with a passage 65 intersected by said valve seat 62 and arranged to afford communication between the chamber 59 and a connection 42 leading to the control line 43.

An abutment member 66 is provided on the valve housing construction 57 and it is arranged to abut with the upper end of a stem 64 in order to open the valve 63 so that air may pass from the high-pressure line 40 to the chamber 59. The upper side of the diaphragm 56 is, of course, subjected to atmospheric pressure, whereas the lower side of the diaphragm is subjected to the desired control pressure. The pressure below the diaphragm normally preponderates over atmospheric pressure thereabove as determined by the spring 54, the latter opposing the control pressure. Hence, with a change in compression of the spring 54, brought about by adjustment of the lever 33, such spring overcomes the existing pressure in the chamber 59, resulting in downward movement of the diaphragm 56 and the abutment 66, thereby causing the latter to open the valve 64 and resulting in the admission of air from the high-pressure line to the chamber 59. Air continues to be admitted to the chamber 59 until the pressure therein is sufficient to balance the pressure due to the change in the adjustment of the spring, and when this takes place the diaphragm 56 and the abutment 66 move upwardly so as to permit the valve 63 to seat, whereupon the flow of air to the chamber 59 is cut off. If, for any reason, the pressure in the control line 43 and the chamber 59 should decline, the diaphragm and the abutment 66 will move downwardly, thereby opening the valve 63 and permitting air to flow into the chamber 59 until the pressure can balance the force of the spring, that is, until the pressure of the air in the chamber 59 and the control line 43 is restored.

If the diaphragm 56 should move upwardly on account of a preponderance of pressure in the chamber 59 over the spring 54, as takes place, for example, when the follower nut 51 is moved upwardly, a valve 67 is operated to place the chamber 59 in communication with the atmosphere in order to relieve the pressure in the chamber 59 and in the control line 43. More particularly, I show the valve housing construction provided with passageway means 68 communicating with the chamber 59, having a valve seat 69 at an intermediate point for the valve 67, and communicating at its upper end with the atmosphere. The valve 67 has an upwardly extending stem 70 arranged to contact with the adjustable abutment 71 carried by a suitable spider member 72 held in place with respect to the structure 61 and affording a journal 73 for the lower end of the spindle 48. A spring 74 cooperates with the valve 67 to cause the latter to seat by upward movement. Assuming, that the force of the spring 54 is reduced by backward movement of the lever 33, or that the pressure in the chamber 59 preponderates over the force of the spring 54 for any reason, the diaphragm 56 would move upwardly and carry the valve housing structure 57 along with it until the stem 70 contacts with the abutment 71, whereupon, the valve 67 would be opened and permit air to escape from the chamber 59 to the atmosphere.

The abutment 66 for opening the valve 63 to let air into the chamber 59 and the abutment 71 to open the valve 67 to let air out of the chamber 59 are rather closely spaced with respect to the stems 64 and 70 of the respective valves so that very little movement is required for opening either valve 63 or valve 67.

In Fig. 8, I show a slightly modified form of construction, so far as the inlet and outlet valves for the chamber 59 are concerned. In this form, the inlet and outlet valves are carried by the housing structure 61, the diaphragm being provided with a downwardly projecting hollow stem 73 for affording communication between the chamber 59 and the atmosphere. When the diaphragm 56 moves downwardly, the stem 73 contacts with the valve member 74, the latter having a stem or spacing portion 75 which contacts with the spring-pressed valve 76 to open the latter, the valve 76 controlling the passage of air through the passage 60 connected to the high-pressure line 40. The valve 74 seats against the inlet of the passage 77 extending through the stem 73 so that, if the stem 73 moves upwardly away from the valve 74, air is permitted to escape from the chamber 59 to the atmosphere. Hence, the modified form of construction shown in Fig. 8 operates in accordance with the same principle as that shown in Fig. 6, the compression of the spring 54 being varied proportionally to the adjustment of the control lever 33 and the pressure of air in the chamber 59 assuming such a value that the air pressure at one side of the diaphragm balances atmospheric and spring pressure at the other side at which time the diaphragm is in an equilibrium position with both the inlet and the outlet valves closed.

The structure of Fig. 6 differs in another respect from that shown in Fig. 8 in that a spring 78 is arranged below the diaphragm, this spring opposing the spring 54 so that the pressure of air in the chamber 59 plus the force of the spring 78 is opposed to the force of the spring 54.

As already pointed out, the inlet passage 60 for the chamber 59 and the outlet passage 65 leading therefrom are intersected by the valve seat 62, this valve seat having a rotary valve member 79 cooperating therewith. As shown in Fig. 11, the valve has two-way passages for affording communication through portions of the passages 65 and 60. For example, in Fig. 11, I show the passages 65 having portions thereof adapted to be placed in communication by the two-way passage 80 provided in the valve 79, the two-way passage 80 having portions 81, either of which is adapted to be placed in communication with the up-stream portion of the passage 65. The passage 80 also communicates with an arcuate recess 82 which registers constantly with the down-stream portion of the passage 65. The rotary valve member 79 is also provided with two-way passage means indicated generally at 83 which is similar in all respects to that already described for the passage 65 and a further description is unnecessary.

The valve 79 is coupled to a stem 85 and the upper end of the latter has a suitable connection for a reverse lever 32, the connection to be hereinafter more fully described. At this point, it may be stated that the reverse lever has two positions of adjustment, one being "forward" and the other being "back" and a certain amount of arcuate movement is provided for the reverse lever 32 and the stem 85 to provide for this. The branches 81 of the two-way passage 80, and likewise of the two-way passage 83, are spaced apart angularly sufficiently so that whether the reverse lever 32 is in "forward" or "back" position, communication is afforded between the control line and the chamber 59, and between the high-pressure line 40 and the valve 63 controlling the flow of air into the chamber 59. In this way, it is possible to provide a regulable controlling force both for the engines and for the electric propulsion means whether the reverse lever is set for "forward" or "back" operation.

Figure 9:
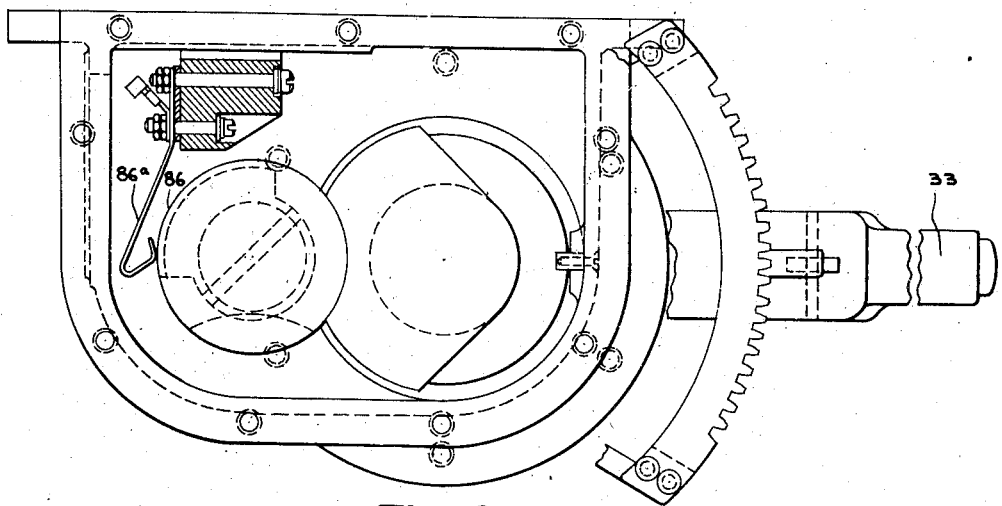
Fig. 9 is a plan view of the apparatus shown in Fig. 8 with the cover removed.
Figure 7:
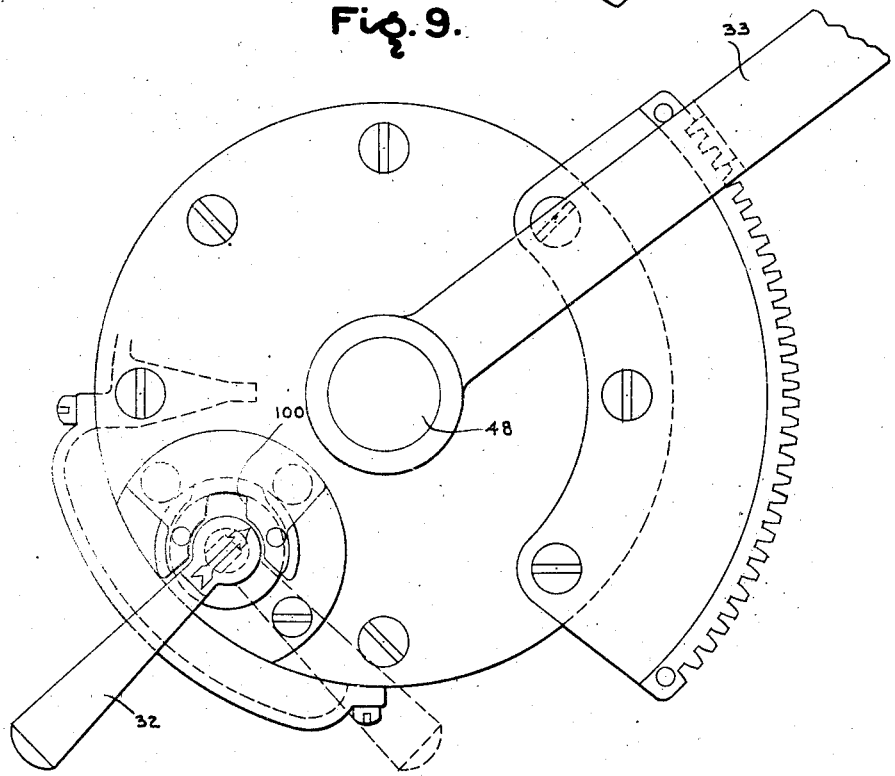
Fig. 7 is a plan view of the master controller shown in Fig. 6.

Reference has already been made to the fact that the reverse lever is operated to control the reversing circuits including the cables 34 and the connections 35 and 36. To this end, in Figs. 6 and 8, I show the reversing shaft 85 provided with a drum controller 86 cooperating with contacts 86a (see Fig. 9) for the reversing circuits, the circuit arrangement being such that when the reversing lever is moved to "forward" position, all of the switches 17 will be operated to provide forward operation of the traction motors 20. On the other hand, with movement of a reverse lever to "back" position, all of the reversing switches 17 will be operated to secure reverse operation of the traction motors 20.

Figure 12:
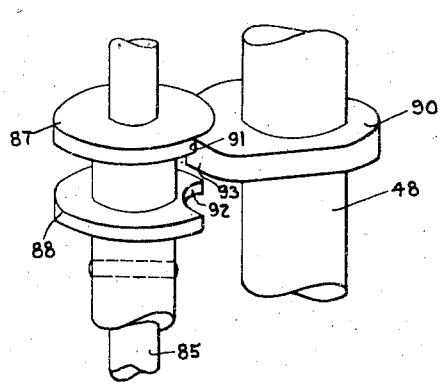
Fig. 12 is a detail view showing the interlock.

Interlocking mechanism is provided between the reversing and main control elements of each master controller, that is, interlocking mechanism is preferably arranged between each reversing shaft 85 and each spindle 48 of the master controller, the reversing mechanism being arranged to prevent effective operation of the control lever 33 unless the reversing lever 32 is either in "forward" or in "back" position and such mechanism operating to prevent movement of the reversing lever unless the main control lever 33 is in "off" or idling position. As shown in Figs. 6, 8 and 12, the interlocking mechanism comprises upper and lower discs 87 and 88 carried by the reversing shaft 85. A sector member of disc construction 90 is carried by the spindle 48 and it has an upper arcuate recess 91 arranged to engage with the periphery of the upper disc 87 when the latter is moved downwardly. The lower disc 88 is provided with an arcuate recess 92 (see Fig. 12), which is arranged to engage with the curved periphery 93 of the disc member 90. A spring 94 tends to move the reversing shaft 85 upwardly so as to cause the arcuate recess 92 in the disc 88 to engage the arcuate periphery of the disc member 93, in which position, the reversing shaft 85 is prevented from rotating. On the other hand, if the shaft 85 is moved downwardly so as to disengage the arcuate recess 92 from the circular periphery 93, then the reversing shaft 85 may be rotated; however, as may be seen from Figs. 6 and 8, the upper disc member 87 is brought into engagement with the recess 91 before the lower disc member 88 moves downwardly below the peripheral portion 93 of the disc member 90, so that as soon as the member 87 engages the arcuate recess 91, the spindle 48 is locked against rotation and when the member 88 moves out of engagement with the circular peripheral portion 93, the reversing shaft 85 may be rotated. The recess 91 is so arranged with respect to the disc member 90 and so related angularly with respect to the spindle 48 and the lever 33 that the lever 33 must occupy idling or "off" position in order that the upper disc member 87 may be brought into cooperation with the recess 91 to lock the spindle 48 against rotation and to unlock the reversing shaft 85.

Operation of the upper and lower disc members 87 and 88 in order to provide for interlocking of the reversing shaft 85 and the spindle 48 in the manner and for the purposes just stated is preferably brought about by the operation of attaching and detaching a reversing lever 32; and, to this end, the upper end of this stem is provided with a connecting portion 95, of any suitable and non-circular section, for engagement with the hub portion 96 of the reversing lever 32, the hub portion having a tongue 97 for engagement in suitable arcuate recesses 98 provided in the bearing construction 99 carried by the cover member for the master controller. The arcuate recess 98 is intersected at an intermediate point by a vertical recess 100 which extends through the detachable plate 101. Hence, it will be seen that the reversing lever 32 may be attached and detached with respect to the reversing shaft 85 when the latter occupies an intermediate position, this position being such that the inlet and outlet passages 61 and 65 leading to and from the pressure chamber 59 are cut off and the main control lever 33 is locked since the arcuate recess 92 in the disc 88 is out of register with the periphery 93 of member 90, whereby the disc 88 is held below the member 90 so that the interlocking connection of the upper disc 87 with the recess 91 is maintained.

Assuming that the main control lever 33 is in "off" position, then the reversing lever 32 may be attached and detached only when the reversing shaft 85 is in such a position as to isolate the associated pressure chamber 59 both with respect to the high-pressure line and with respect to the control line, thereby isolating the master controller when the control shaft is in this position. In order that the lever 32 may be pressed down to bring the tongue 97 into engagement with either portion of the arcuate recess 98, it is necessary that the upper disc 87 shall be capable of entering the arcuate recess 91. Hence the arcuate recess 91 is so located angularly with respect to the spindle 48 and the lever 33 that it occupies a position registering with the periphery of the upper disc 87 when the lever 33 is in "off" position. The disc 87 and the recess 91 cooperate to provide an interlock, thereby preventing the spindle 48 from being turned until the reversing member 32 has reached the end of its movement, that is, has reached either the "forward" or "back"

position; and, when the reversing lever reaches either of these positions, it rises, the recess 98 being provided with suitable enlarged portions 98a (see Fig. 10), to permit upward movement, such upward movement resulting in disengagement of the upper disc 87 from the recess 91 and engagement of the dics 88 with the arcuate portion 93, thereby locking the reversing shaft 85 against movement and unlocking the spindle 48, whereupon the lever 33 may be actuated to operate the controller. Hence, it will be seen, that the interlock serves to prevent effective operation of the master controller unless the reversing lever occupies either "forward" or "back" position, and it is impossible, due to the interlock, to move the lever 32 either to "forward" or "back" position unless the lever 33 occupies "off" position. Furthermore, the interlock serves to prevent movement of the control lever 33 from "off" position so long as the reversing member occupies any position between "forward" and "back".

Having now described means for providing an air pressure in the control line 43 which is a function of the compression of the spring 54 and, therefore, of the position of adjustment of a controller lever 33, I will now refer to means for utilizing the air supplied to the control line. As already pointed out, the control line air pressure may be directly applied for the purpose of controlling the engine, or it may operate through a relay 44. Referring now more particularly to the construction of the relay, I show two modified forms of which that shown in Fig. 13 is the preferred form.

Figure 13:
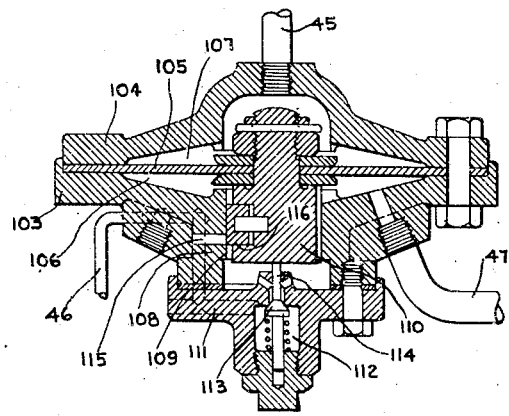
Fig. 13 is a vertical sectional view showing the preferred form of relay valve.

Referring first to Fig. 13, I show a two-part housing consisting of parts 103 and 104 with a diaphragm 105 clamped therebetween, the diaphragm cooperating with the parts 103 and 104 to provide chambers 106 and 107. The part 103 is provided with an extension or hub portion 108 having a guide opening 109 within which there is slidable a plunger portion 110 carried by the diaphragm 105. The branch 45 from the primary control line 43 communicates with the chamber 107. The branch 46 from the high-pressure line 40 communicates, by way of the passage 111, with a chamber 112, a valve 113 being provided to control communication between the chamber 112 and the chamber 106. The secondary line 47 going to a pressure-responsive, speed-changing device 29 of an engine 12 communicates with the chamber 106. The plunger 110 is arranged to contact with the inner end of the stem 114 carried by the valve 113 so that when the diaphragm moves in response to the primary control pressure preponderating over the secondary control pressure, the valve 113 is opened to admit high pressure air from the branch 46 to the chamber 106, the admission of such air continuing until an equilibrium of pressures is obtained in the chambers 106 and 107, at whch time the diaphragm will occupy a normal position with the valve 113 seated.

The extension 108 is provided with an atmospheric opening 115 which is controlled by a slide valve 116 carried by the plunger 110. Assuming, therefore, that the pressure at the secondary control side of the diaphragm 105 should exceed that at the primary control side, such diaphragm 105 would be deflected, thereby moving the plunger 110 and the slide valve 116 so as to establish communication between the chamber 106, that is, the secondary control side, with the atmosphere and resulting in a reduction in pressure at the secondary control side. This reduction in pressure continues until equilibrium of pressures is restored in the chambers 106 and 107, at which time the slide valve 116 moves back to cut off the atmospheric passage 115.

From the apparatus shown in Fig. 13 and just described, it will be apparent that changes in pressure in the primary control line 43 are followed by equal changes in pressure in the secondary control line 47. In this way, it is possible to use the relay to provide for pressure changes and considerable flow of air in the secondary control line without having very much flow in the primary control line, this being desirable particularly where the primary control line assumes considerable length, as would be the case where several cars are coupled together and a common primary control line extends throughout the length of the coupled cars.

Figure 14:
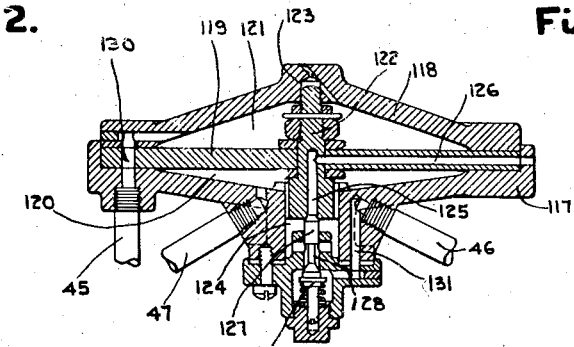
Fig. 14 is a view similar to Fig. 13 but showing a modified form of valve.

In Fig. 14, I show a further form of my relay mechanism which is modified from the point of view of the connections, the diaphragm and the valves. In this view, I show housing parts 117 and 118 between which there is clamped a diaphragm 119, the diaphragm and the parts defining chambers 120 and 121. The diaphragm is provided with a central stem construction 122 which fits a suitable guide 123 and a guideway 124 provided in the housing part 117. The stem construction is provided with a central passage 125 terminating at its lower end in a valve seat and communicating with a radial passage 126 arranged in the diaphragm 119 and communicating with the atmosphere. A valve 127 cooperates with the lower end of the passage 125 and a spacing member 128 is arranged between the valve 127 and a spring-pressed check valve 129. The primary control line 45 is connected to the housing structure and communication thereof is afforded by way of the passage 130 with the chamber 121. The high-pressure air line 46 communicates with a passage 131 going to the space beneath the spring-pressed check valve 129. The secondary control line 47 communicates with the chamber 120. Assuming that the primary control pressure in the chamber 121 exceeds the secondary control pressure 120, the diaphragm 119 will be deflected thereby opening the valve 129 and permitting high-pressure air to enter through the passage 131 and passing to the chamber 120 from which it passes to the secondary control line 47, this operation continuing until equilibrium of pressures is restored between the chambers 120 and 121. On the other hand, should the secondary control pressure in the chamber 120 exceed the primary control pressure in the chamber 121, the diaphragm 119 will be deflected so as to move the stem structure away from the valve 127, thereby opening the passages 125 and 126 to the atmosphere, whereupon reduction in pressure in the chamber 120 will take place, this reduction going on until equilibrium of pressures is restored between the chambers 120 and 121.

Figure 15:
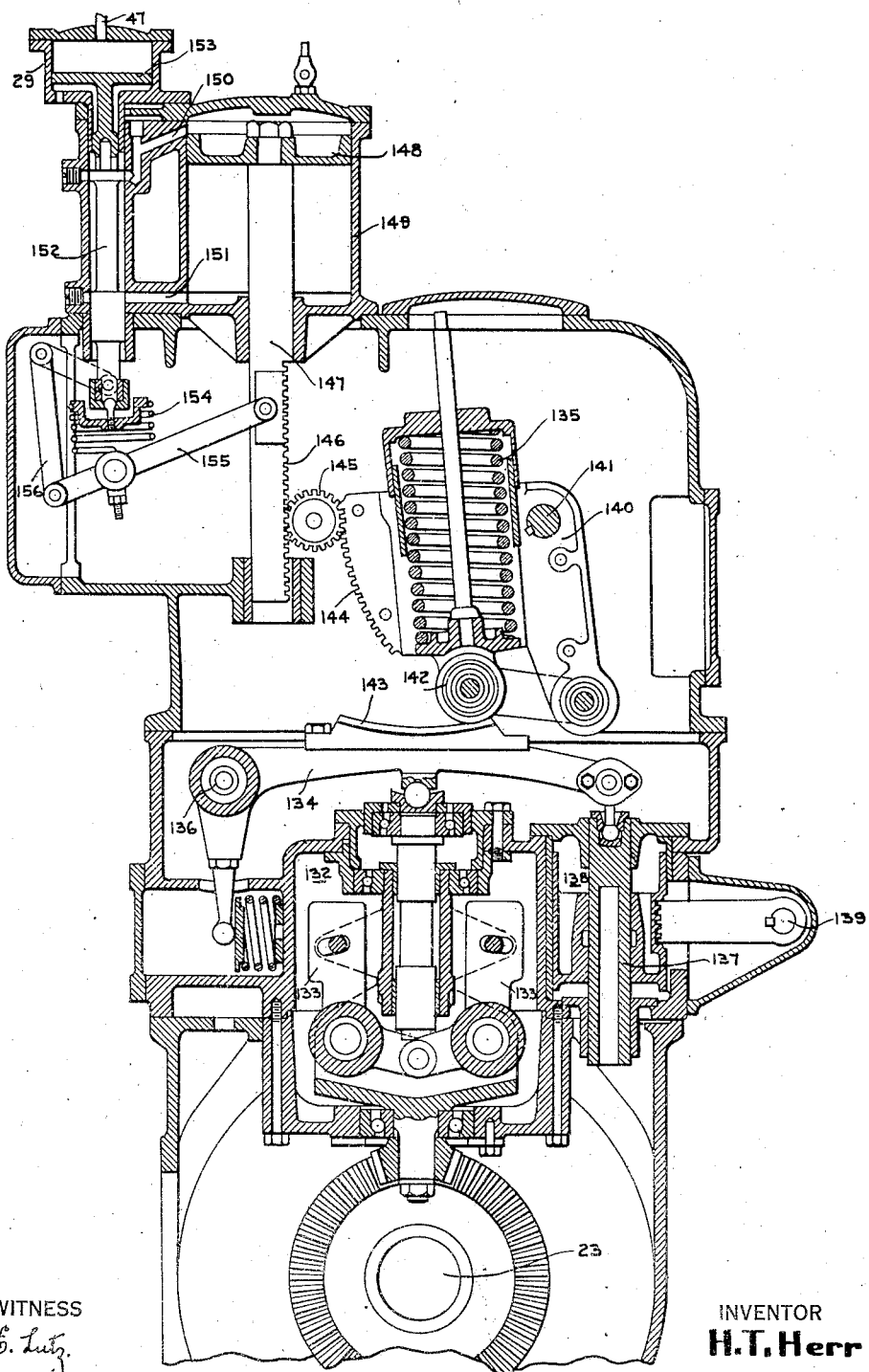
Fig. 15 is a sectional view of change speed governor mechanism.

Having now described a suitable relay for applying desired pressures to the pressure-responsive devices 29 of the engine governors 13, such pressures being determined by positions of adjustment of a main control lever 33, I will now describe, by way of example, a suitable form of governor apparatus which may be controlled by my improved control system. In Fig. 15, I show an engine crank shaft 23 operating a centrifugal governor mechanism indicated generally at 132, this governor mechanism including centrifugal weights 133, which are opposed by a lever 134 having a spring 135 cooperating therewith. The lever 134 is fulcrumed at one end, at 136, and the other end thereof is connected to a pilot valve 137 of a suitable servo-motor, at 138, the servo-motor having its operated element arranged to operate a shaft 139 for controlling the amount of fuel injected per engine stroke.

In order to effect changes in speed of the governor from no load to full load, it is necessary that the spring 135 be shifted along the lever 134, the nearer the point of application of the spring to the lever is to the fulcrum 136, the less will be the effective force applied by the spring to the lever and resisting centrifugal force of the fly balls 133, this corresponding to a reduction in the governing speed of the governor. On the other hand, if the point of application is shifted toward the right, the governing speed is increased. In the position shown in the drawings, the speed setting of the governor is at a maximum. In order that this result may be achieved and that the governor may operate with good regulation throughout its speed range, it is necessary that both the scale of the spring and the effective force thereof shall be varied whenever the point of application of the spring to the lever is varied. Therefore, I show the spring 135 carried by a suitable rocker member 140 and connected to the rocker shaft 141. Also, the spring cooperates with a roller 142 engaging a curved track 143 carried by the lever 134. Hence, due to the relative arrangement of the spring with respect to its carrier 140 and the pivot shaft 141, due to the relative position of the spring and its carrier to the track 143, and to the curvature of the track 143, it is possible to secure, for all positions of adjustment of the point of application of the spring with respect to the lever such scale of spring and such spring force as will result in good regulation for each speed.

In order to effect changes in the speed; it is necessary that the carrier 140 shall be rocked about the axis of the rock shaft 141; and, to this end, I show the carrier 140 provided with a sector rack 144 meshing with a pinion 145, the latter, in turn, meshing with a rack 146 carried by the piston rod 147 of the operating piston 148 arranged in the operating cylinder 149.

Motive fluid for operating the operating piston is admitted to and exhausted from either end thereof by way of the passages 150 and 151, these passages being controlled by a suitable pilot valve 152 having its upper end connected to a piston 153 arranged in a cylinder 29 with which end a secondary control line 47 or a primary control branch 45 communicates. The lower end of the pilot valve is connected, by means of a spring 154, with a floating lever 155, one end of the floating lever being pivoted to a link 156 while its other end is pivotally connected to the piston rod 147. In operation, with a change in air pressure above the piston 153, the latter moves either downwardly or upwardly, thereby causing motive fluid to be admitted to and exhausted from the operating cylinder 149 and causing the operating piston 148 to move. If the air pressure above the piston 153 is reduced, then the spring 154 causes the pilot valve to move upwardly. On the other hand, should the air pressure above the piston 153 exceed the spring pressure, the pilot valve will move downwardly. Whenever there is a change in pressure, the pilot valve moves; and this is followed by movement of the operating piston, such movement resulting in a change in the force of the spring 154 so that equilibrium is again established between the force of the spring 154 and the pressure above the piston 153, the pilot valve 152 occupying a neutral cut-off position when equilibrium is again established. Hence, it will be seen that I have provided a governor having a speed changer whose position is a function of the controlling air pressure.

The particular details of the governor and its controlling mechanism, just referred to, do not constitute parts of my present invention and they have only been briefly referred to in order to make the connection thereof with the present invention clear. For a more detailed description and a better understanding of the governor mechanism and the speed changer shown in Fig. 15, reference should be had to my application Serial No. 243,724, filed December 30, 1927, for internal combustion engine control mechanism. It is to be understood that the governor shown and described is referred to, by way of example merely. Any governor capable of governing from no load to full load over a suitable speed range may be used.

As shown in Figs. 4 and 5, the speed changer shaft 141 is arranged to be connected, through a suitable link 157 to means provided on the engine for changing the timing of injection with respect to the cycle. With an increase in speed, the time at which injection should take place should be advanced and with a decrease in speed retardation of the time of injection should take place.

Figure 3:
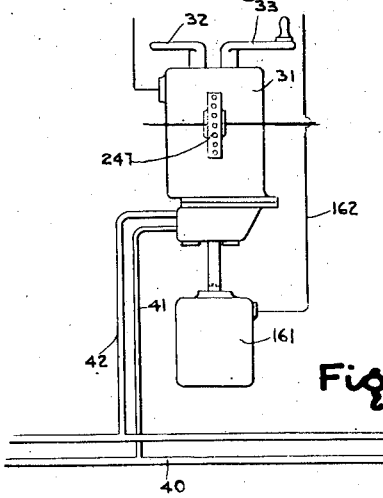
Fig. 3 shows a modified form similar to Fig. 2 except that the electric controller is mechanically coupled to the main controller.

Having now traced out the pneumatic control system from the high-pressure line 40, through a master controller 31, the primary control line 43, the relay 44, the secondary control line 47 and the governor speed changer, reference will now be had to the means for controlling series and parallel connections of the traction motors 20. This may be done either by having a controller directly connected to the spindle 48 operated by the main control lever 33 or the electrical controller may be operated indirectly or consequentially due to movement of the control lever 33. In Figs. 2, 5 and 6, I show the controller operated directly from the main control spindle 48. Referring particularly to Fig. 6, the controller drum 160 for controlling the series parallel connections is carried by the spindle 48. In Fig. 3, I show a modified form wherein the electrical controller 161 is connected to an end of the spindle arranged to extend below the master controller. In all cases, where controlling is effected directly by manual actuation of the main control lever 33, it is necessary that circuits go from each controller to the series-parallel switches 18 for controlling series and parallel connections of the motors 20. In Fig. 5, I show cable connections 162 going to the controller connected to cables 163 having branches 164 leading to the series-parallel switches 18. Ends of the cable 163 are provided with suitable couplings or connectors 165, so that the corresponding cable of a second car may be connected thereto.

As shown in Fig. 2, the series-parallel switches 18 may be controlled by the control line air pressure. In Fig. 2, I show, diagrammatically, a branch of the control line 47 going to the switch device 18, the latter device employing any suitable controller which operates in accordance with the intensity of air pressure to effect the desired connections.

In Fig. 4, I show a further modified form where the control of series and parallel connections is effected by a controller operated by the control line air pressure. In this view, the piston 153a of the speed-changer, pressure-responsive device has a rod 167 extending thereabove and into an electrical controller 168 of any suitable type, the latter being shown as provided with a cable 169 including suitable circuits for the series-parallel switch 18.

Figure 17:
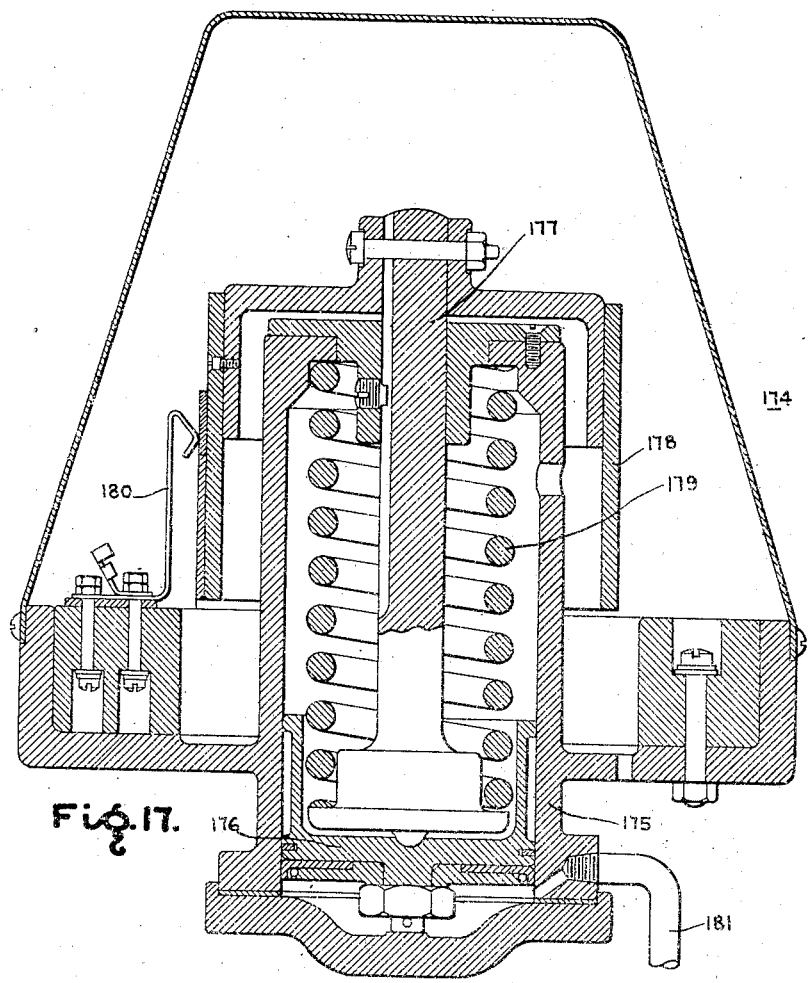
Fig. 17 is a vertical sectional view of the pneumatic-electrical control element of Fig. 16.

In Fig. 16, I show a further modified form of my invention in which I provide a pneumatically operated controller indicated at 174 and responsive to the pressure of air in the control line 43 to establish any suitable circuits going to the electro pneumatic switch device at 18a. Fig. 17 shows more in detail the controller, at 174. In this view, it will be seen that the controller comprises a stationary cylinder structure 175 and a movable piston element 176 therein having a stem 177 carrying a contact drum 178. A spring 179 is arranged between the piston and the upper end of the cylinder. A suitable number of contacts 180 is carried by a flange or other part of the cylinder structure. Air from the control line 43 is admitted by a branch 181 beneath the piston 176. In this way, electrical circuits are established in accordance with the pressure existing in the control line 43; and these circuits, in turn, serve to energize the electro pneumatic valves arranged in the device indicated generally at 18a, such device having a connection 128 (Fig. 16) with the high-pressure line 40 to furnish air thereto in order to secure operation of the main circuits in any suitable way.

In Figs. 18, 19, 20 and 21, I show a further modified form of my invention, wherein there is shown a form of pneumatic relay and circuit control device. In these views, I show a cylinder structure 183 having a connection 184 to the control line 43 and a connection 185 with the high-pressure line 40. Within the cylinder structure, there is arranged a piston 186 and a spring 187 is disposed between one end of the structure and the piston. Control line air is admitted through the line 184 to one side of the piston and acts theron to overcome the spring 187. The piston is mechanically connected, by an element 188, arranged to move in a slot 188a, to a slide valve 189, the latter being arranged in a valve chamber 190 having a seat 191.

Figure 19:
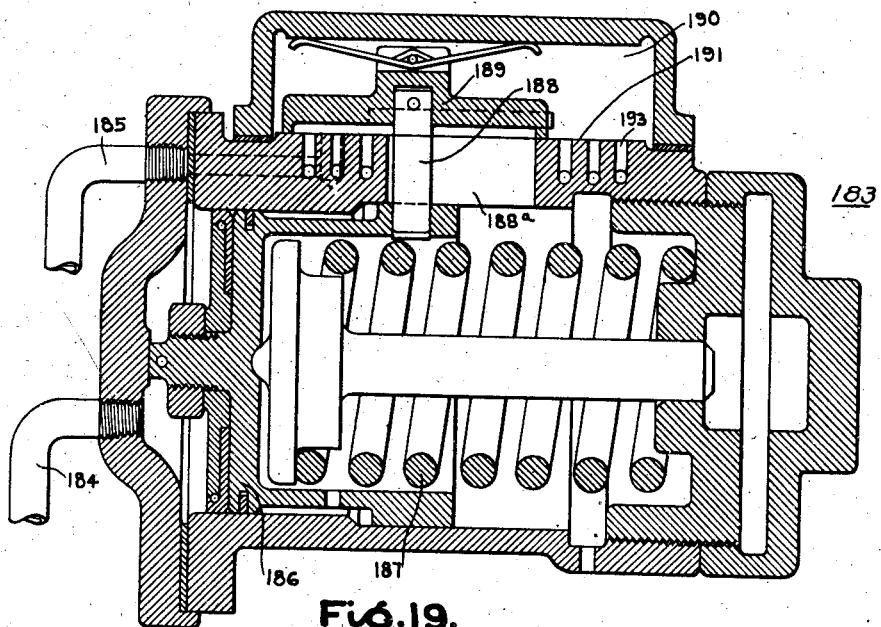
Figs. 19, 20 and 21 are detail views pertaining to the pneumatic control of Fig. 18.
Figure 20:
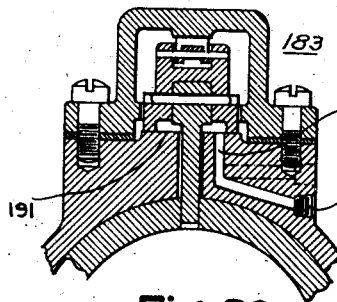
Figure 21:
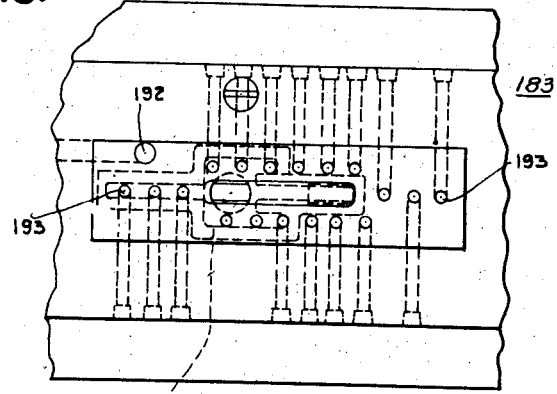

High-pressure air from the connection 185 is supplied to the chamber 190 through the passage 192 so that the chamber 190 is at all times under high pressure. Referring to Figs. 19, 20 and 21, it will be seen that the seat 191 is provided with a number of passages 193 having outlets 194. The slide valve 1889 is arranged to progressively cover and uncover the passages 193; and, as shown in Fig. 21, several passages to the right of the slide valve, indicated in dash lines, are exposed to the interior of the chamber 190. As the slide valve is moved, some of the passages are covered and some are uncovered. If a passage is covered, interruption of air pressure therethrough takes place, and if a passage is uncovered, air under pressure is supplied thereto for the operation of any suitable apparatus. While in Figs. 19, 20 and 21, I show a large number of passages 193 for the operation of any suitable parts which it may be desired to control, in Fig. 18, I show only two passages connected to conduits 195 going to a pneumatically operated switch device 18b.

Figure 18:
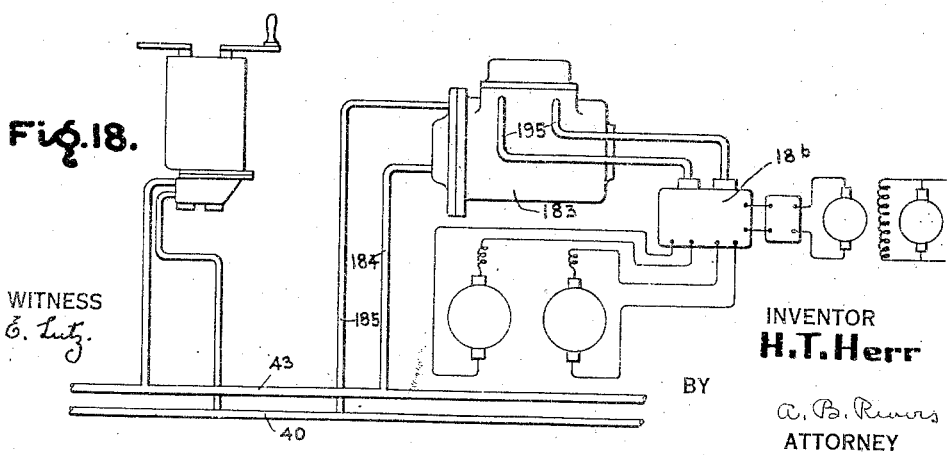
Fig. 18 is a diagrammatic view showing a pneumatic relay control.

In Figs. 22, 23, 24, 25 and 26, I show a further modified form of my invention, which is similar in a broad way to that shown in Fig. 18, but which is especially modified to provide a lag or dwell effect. In accordance with this form, the control line 43 is connected by a branch 197 with a cylinder 198 having a piston 199 arranged therein, movement of the piston in response to air pressure being resisted by two springs 200 and 201, the spring 201 being the stronger. The spring 201 is carried by a housing construction 202 and one end thereof bears against a follower or abutment 203, the abutment 203 engaging an abutment 204 which engages one end of the spring 200. The abutment 204 is of smaller diameter than the abutment 203 and readily capable of movement through the guide opening 205 of the abutment 203. Adjustment of the spring 200 may be readily effected by relative adjustment of the threaded follower 206 carried by the follower 204. In like manner, adjustment of the spring 201 may be effected by adjusting the threaded follower 207. The piston structure is connected to a slide valve 208 arranged in a chamber 209 and adapted to afford communication between that chamber and any of the passages 210 exposed by being uncovered by the slide valve 208.

Assuming that air under pressure is admitted to the left-hand side of the piston 199, the piston structure will move toward the right; however, as the spring 201 is stronger than the spring 200, only the spring 200 will be at first compressed. This movement will continue, with only deflection of the spring 200, until the abutment 203 engages with one end 211 of the piston structure, whereupon, the pressure has to build up over a decided step before the spring 201 may be compressed. This gives a dwell in the operation of the device even though the control line air pressure is being increased. In Fig. 22, I show lines 212 connected to two of the passages 210, these lines being so disposed that the dwell referred to may take place. Also, in this view, there is shown a branch 213 leading from the high-pressure air line 40 to the chamber 209. Hence, as before, the chamber is supplied with high-pressure air and air from such chamber enters such of the passages 210 as may be exposed by the slide valve 208. In Fig. 22, I show passages 212 so connected that the dwell referred to may take place between the time one is energized and the other is energized. The lines 212 go to a pneumatic electric switch 18*b* for establishing series-parallel connections for the motors 20. In the change-over from series to parallel operation, it is found to be desirable to move the controller handle over a range without effecting the connections. This makes it possible to bring about the desired acceleration of the engines before change-over from series to parallel and then to effect a suitable control of the engines during the period of change-over from series to parallel. It is, for this reason, that I show the dwell arrangement provided for in the form shown in Figs. 22, 23, 24, 25 and 26.

In Figs. 27 and 28, I show a further modified form of my invention wherein the control line pressure operates through a relay to effect operation of a slide valve to distribute air through suitable controlling passages. In these views, I show a relay cylinder 215 having a connection 216 to the control line 43 together with a piston 217 therein, the piston being connected to a pilot valve 218 for controlling the admission and exhaust of high-pressure air to either side of the operating piston 219 arranged in the operating cylinder 220, high-pressure air entering through the branch 221 of the line 40 and exhausting through the outlet 222 which communicates with the recesses 223 in the valve housing. The operating piston 219 is connected to a rod 224 which is arranged to operate a slide valve 225, similar to the slide valve 189 of Fig. 19. The slide valve 225 is arranged in a chamber 226 to which air is supplied from the high-pressure line 40 by way of a passage 227. As shown in Fig. 28, the chamber is provided with a valve seat 228 having a plurality of passages 229 extending therethrough. If any of the passages are exposed by the slide valve, high-pressure air will be supplied therethrough to any suitable part to be controlled. A spring 231 is arranged between the pilot valve 218 and a floating lever 232 having a connection with the rod 224 and fulcrumed at 233.

If there is a change in control line pressure, the piston 217 moves in response to such change, this movement resulting in operation of the operating piston. As soon as the operating piston starts to move, the lever 232 is operated to effect a change in the tension of the spring 231. Movement of the operating piston 219 will continue until the pressure or force due to the spring 231 is placed in equilibrium with the air pressure acting on the piston 217 at which time the pilot valve 218 will be in neutral or cut-off position. If the pressure should increase, the pilot valve will move toward the left, thereby admitting high-pressure motive fluid from the passage 221 to the left-hand side of the operating piston 219, and this will result in movement of the piston 219 toward the right. Movement of the piston 217 will, therefore, continue until the pressure of air existing thereon is equal to the spring pressure; however, as movement of the operating piston 219 toward the left operates to increase the spring pressure, operation of such operating piston has the effect of restoring the pilot valve to neutral or cut-off position. On the contrary, should the air pressure acting on the piston 217 decrease, the spring 231 moves the pilot valve 218 toward the right, thereby furnishing high-pressure air to the left-hand side of the operating piston 219 and moving the latter and its rod 224 toward the right, thereby decreasing the force of the spring 241. When the control air line pressure and the spring 231 are again in equilibrium, then the pilot valve 218 will be in neutral or cut-off position.

The apparatus shown in Fig. 28 is advantageous in that the control line air pressure does not suffer any substantial amount of flow incident to a change in control pressure, the required flow of operating air being taken care of by the relay, the operating air coming directly from the high-pressure line. In Fig. 27, lines 242 serve to supply operating air to the series-parallel switch 18*b*.

Upon reference to various figures of the drawings, it will be seen that I provide means whereby any engine of a plurality of coupled cars may be isolated. To this end, I show the control lines provided with magnetic cut-out valves, indicated generally at 243, the valves for each engine having solenoids 244 arranged in circuits incorporated in cables 246, which is connected to push button switch devices 247 provided on each master controller 31 and the cables of each vehicle or car being provided with terminal connectors 248 whereby the cable 246 of one car may be connected to the corresponding cable of another car. It will be understood that each push button control device 247 will have push buttons for the respective control circuits of the solenoid valves of the respective engines. Hence, any desired engine for any of the cars may be isolated by the operation of a suitable button on any of the master controllers.

While I have described control circuits as operating in response to air pressure, nevertheless, it is to be understood that it is within the purview of my invention to utilize any medium with which changes in force or energy intensity may be effected, whereby, for every position of a master control lever, a predetermined force is developed in the control line for operating the speed-changing device of the engine as well as the remaining apparatus.

It will furthermore be seen that, in accordance with the broader aspects of my invention, I have devised a multiple unit control system for electric propulsion means of a plurality of railway vehicles and having a plurality of controllers movable, one at a time, to control the electric propulsion means of all the vehicles. Each of the vehicles has mounted thereon an internal combustion engine, preferably a Diesel engine, arranged to drive the electric propulsion means; and the multiple unit control system for controlling the electric propulsion means also controls the speed of the engines, that is, controlling movement imparted to a selected controller not only results in the desired control of the electric propulsion means, but also of suitable changes in engine speed. The control system is restricted to control from a single point due to the fact that only one reverse lever would be provided for a train of coupled cars. In changing the reverse lever from one controller to another, the operator would necessarily have to bring the control lever of the controller from which the reverse lever is removed to "off" position; and, upon removal of the reverse lever with the control lever in this position, the interlock moves automatically to lock the control lever in this position. Upon attachment of the reversing lever to a selected controller, such reversing lever must first be moved either to "forward" or to "back" positions before the control lever may be operated. In this way, it is assured that operation of the controlling system to control the engine speed and the electric propulsion means is restricted to one controller at a time and operation of a controller from which the reversing lever is detached is positively prevented by the interlocking means. If, at any time, it is desired to isolate one of the engines from the control system, this may be readily done by operating the push button control system, whereupon magnetic valves come into play to cut off the speed-changing means of a selected engine from the control system.

It will also be understood that, while I have devised a new system for controlling coupled railway vehicles, each of which is provided with its prime mover, the prime mover or prime movers and the controlling system may be used with any suitable transportation apparatus or, for that matter, may be applied in stationary practice.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a plurality of coupled railway vehicles having electric propulsion motors and a multiple-unit control system for the motors and having a plurality of connected controllers, of prime movers and generators carried by the vehicles for developing energy for utilization by the motors, governors for the respective prime movers and each governor having speed-changing means, and means responsive to motor-controlling movement of a controller for controlling the speed-changing means.

2. The combination with a plurality of coupled railway vehicles having electric propulsion motors and a multiple-unit control system for the motors and having a plurality of connected controllers, of prime movers and generators carried by the vehicles for developing energy for utilization by the motors, a source of energy, means associated with each controller for transforming energy derived from the source into energy whose intensity is dependent upon the position of adjustment of a controller, and means for effecting speed adjustments of the prime movers in accordance with the intensity of transformed energy.

3. The combination with a plurality of coupled railway vehicles having electric propulsion motors and a multiple-unit control system for the motors and having a plurality of connected controllers, of prime movers and generators carried by the vehicles for developing energy for utilization by the motors, means responsive to operation of a controller for effecting speed adjustments of the prime movers, and means carried by each controller for selectively isolating the prime movers from the last-named means.

4. The combination with a plurality of vehicles having electric propulsion motors, of connected prime movers and generators carried by the vehicles for developing energy for utilization by the motors, and a multiple-unit control system for controlling the motors and the prime movers, said system including a plurality of controllers and means rendered effective by operation of a controller for supplying energy whose intensity is dependent upon the adjustment of an operated controller for effecting speed adjustments of the prime movers.

5. The combination with a plurality of vehicles having traction wheels, of prime movers carried by the vehicles, means for transmitting power from the prime movers to the traction wheels, and a multiple-unit control system for controlling the power transmission means and the prime movers, said system including a plurality of controllers and pneumatic means rendered effective by operation of a controller for supplying energy whose intensity is dependent upon the adjustment of an operated controller for effecting speed adjustments of the prime movers.

6. The combination with a plurality of vehicles having electric propulsion motors, of connected prime movers and generators carried by the vehicles for developing energy for utilization by the motors, and a multiple-unit control system for controlling the motors and the prime movers, said system including a plurality of controllers, a source of fluid under pressure, means for transforming the pressure of fluid received from the source in accordance with the position of adjustment of a controller, and means utilizing the transformed pressure of fluid to control the speed of the prime movers.

7. The combination with a plurality of vehicles having traction wheels, of prime movers carried by the vehicles, means for transmitting power from the prime movers to the traction wheels, and a multiple-unit control system for controlling the power transmission means and the prime movers, said system including a plurality of controllers, a source of air under pressure, a line providing for adjustable air pressures and operatively associated with the prime movers to effect speed adjustments of the latter, and means operatively associated with each controller for transferring air from said source to said line and for maintaining in said line pressure of air dependent upon the adjustment of an operated controller.

8. The combination with a plurality of vehicles having traction wheels, of prime movers carried by the vehicles, means for transmitting power from the prime movers to the traction wheels, and a multiple-unit control system for controlling the power transmission means and the prime movers, said system including a plurality of controllers, a high-pressure air line, a primary controlling air-pressure line, means operatively associated with each controller for transferring air from the high-pressure line to the primary controlling air-pressure line and maintaining a pressure in the latter dependent upon the adjustment of an operated controller, secondary control lines associated with the respective prime movers to effect speed adjustments of the latter, and relays operated by the pressure of air of the primary controlling line for supplying from the high-pressure line to the secondary control lines air whose pressure is dependent upon the primary controlling line air pressure.

9. The combination with a plurality of vehicles having traction wheels, of prime movers carried by the vehicles, means for transmitting power from the prime movers to the traction wheels, and a multiple-unit control system for controlling the power transmission means and the prime movers, said system including a plurality of controllers, a primary controlling air-pressure line, means operatively associated with each controller for maintaining in said line pressure of air dependent upon the adjustment of an operated controller, secondary control lines associated with the respective prime movers to effect speed adjustments of the latter, and relays operated by the pressure of air in the primary control for supplying air to the secondary control lines.

10. The combination with a plurality of vehicles having traction wheels, of prime movers carried by the vehicles, means for transmitting power from the prime movers to the traction wheels, and a multiple-unit control system for controlling the transmission means and the prime movers, said system including a plurality of controllers, a source of air under pressure, a controlling air-pressure line operatively connected to the prime movers for effecting speed adjustments of the prime movers in accordance with the pressure of air in said line, means operated by each controller for transferring air from said source to said control line and for maintaining pressure in the latter dependent upon adjustment of an operated controller, and means for selectively isolating the prime movers from the control line.

11. The combination with a plurality of vehicles having reversible electric propulsion motors, of connected prime movers and generators carried by the vehicles for developing energy for utilization by the motors; a multiple-unit control system for controlling the motors and the prime movers, said system including a plurality of controllers each of which is provided with main controlling and reversing elements, means rendered effective by operation of a main controlling element of a controller for effecting speed adjustments of the prime movers, and means rendered effective by operation of a reversing control element of a controller to control the direction of operation of the propulsion motors; an operating lever attachable to and detachable from a reversing control element when the latter occupies a predetermined position; and means rendered effective by a reversing control element when the latter occupies said predetermined position for rendering the associated main control element ineffective to control speed adjustments of the prime movers.

12. The combination with transportation apparatus having electric propulsion motor means and a controlling system for the motor means, said controlling system including one or more controllers, of a connected prime mover and generator carried by the apparatus for developing energy for utilization by the motor means, and energy source, means for transforming energy received from said source into energy whose intensity is dependent upon the extent of operation of a controller, and means utilizing said transformed energy to effect speed adjustments of the prime mover.

13. The combination with transportation apparatus having electric propulsion motor means and a controlling system for the motor means, said controlling system including one or more controllers, of a connected prime mover and generator carried by the apparatus for developing energy for utilization by the motor means, a source of fluid pressure, means for transforming pressure of fluid received from said source into a pressure dependent upon the extent of operation of a controller, and means utilizing fluid under pressure received from the transforming means to effect speed adjustments of the prime mover.

14. The combination with transportation apparatus having electric propulsion motor means and a controlling system for the motor means, said controlling system including one or more controllers, of a connected prime mover and generator carried by the apparatus for developing energy for utilization by the motor means, a governor for the prime mover including a pressure-responsive speed changer, a source of fluid pressure, means for transforming pressure of fluid received from said source into pressure dependent upon the extent of operation of a controller, and means utilizing fluid received from the transforming means for adjusting said pressure-responsive speed changer.

15. The combination with transportation apparatus having reversible electric propulsion motor means and a controlling system for the motor means including one or more controllers each of which is provided with main and reversing controlling elements, of a connected prime mover and generator carried by the apparatus for developing energy for utilization by the motor means, a source of energy, means for transforming energy received from said source into energy whose intensity depends upon the extent of adjustment of a main control element, means responsive to the intensity of transformed energy for controlling the speed of the prime mover, and means for interrupting the supply of energy to a transforming means when the associated reversing element occupies a predetermined position.

16. The combination with transportation apparatus having reversible electric propulsion motor means and a controlling system for the motor means including one or more controllers each of which is provided with main and reversing controlling elements, of a connected prime mover and generator carried by the apparatus for developing energy for utilization by the motor means, a source of fluid under pressure, transforming means associated with each controller for transforming the pressure of fluid received from the source into pressure dependent upon the position of adjustment of the associated main control element, means utilizing the transformed pressure of fluid to effect speed adjustments of the prime mover, and a valve operated by a reversing control element for establishing communication between the fluid source and the associated transforming means when said reversing control element is in forward and back positions and for interrupting such communication when the control element is in an intermediate position.

17. The combination with transportation apparatus having reversible electric propulsion motor means and a controlling system for the motor means including one or more controllers each of which is provided with main and reversing controlling elements, of a connected prime mover and generator carried by the apparatus for developing energy for utilization by the motor means, a source of fluid under pressure, transforming means associated with each controller for transforming the pressure of fluid received from the source into pressure dependent upon the position of adjustment of the associated main control element, means utilizing the transformed pressure of fluid to effect speed adjustments of the prime mover, and valves operated by a reversing control element for establishing communication of the source and the transforming means and between the transforming means and the utilizing means, respectively, when such control element is in forward and back positions and for interrupting communication when the control element is in an intermediate position.

18. The combination with transportation apparatus having reversible electric propulsion motor means and a controlling system for the motor means including one or more controllers each of which is provided with main and reversing controlling elements, of a connected prime mover and generator carried by the apparatus for developing energy for utilization by the motor means, a source of energy, means for transforming energy received from the source into energy whose intensity is dependent upon the extent of adjustment of a main control element, means utilizing transformed energy for effecting adjustment of the prime mover in accordance with the intensity of transformed energy, interlocking means between the main and reversing control elements of each controller to prevent operation of either element unless the other occupies a predetermined position, and means operated by a reversing element for interrupting the flow of energy from the source to the associated transforming means and from the latter to the utilizing means except when the reversing element occupies predetermined positions.

19. The combination with a plurality of coupled vehicles having traction wheels, of prime movers carried by the respective vehicles, means for transmitting power from the prime movers to the traction wheels, a governor for each prime mover and including an adjustable speed changer, a source of energy, means for transforming energy derived from said source into energy of a desired intensity, and means responsive to the intensity of transformed energy for controlling the power transmission means and for adjusting the speed changers.

20. The combination with a plurality of coupled vehicles having traction wheels, prime movers carried by the respective vehicles, means for transmitting power from the prime mover of each vehicle to the traction wheels thereof, means for varying the speed of each prime mover, a source of energy, means for transforming energy derived from said source into energy of a desired intensity, and means utilizing the transformed energy for effecting adjustments of said prime mover speed changing means, whereby the prime movers may be caused to operate at speeds depending upon the intensity of transformed energy.

21. The combination with a plurality of coupled vehicles having traction wheels, prime movers carried by the respective vehicles, means for transmitting power from the prime mover of each vehicle to traction wheels thereof, a governor for each prime mover and including a speed changer, a source of energy, means for transforming energy derived from said source into energy of a desired intensity, and means for supplying transformed energy to the speed changers to effect adjustments of the latter in accordance with the intensity of transformed energy.

22. The combination with transportation apparatus, of a prime mover mounted on the apparatus; propulsion means for the apparatus; adjustable power transmission means for connecting the prime mover to the propulsion means; a governor for the engine and including a speed changer; and a controlling system for the electric propulsion means and for the speed changer including a controller, a source of energy, means responsive to operation of the controller for transforming energy derived from said source into energy of a desired intensity, and means for utilizing the transformed energy to control the speed changer.

23. The combination with a plurality of coupled vehicles each having traction wheels, of prime movers on the respective vehicles, electric propulsion means for connecting the prime movers to the traction wheels, a multiple unit control system for the electric propulsion means embodying a plurality of controllers on the vehicles and each controller having a range of controlling movement for controlling all of the electric propulsion means, and means operated by an operated controller during the aforesaid range of controlling movement for changing the speed of all of the engines.

24. The combination with a plurality of vehicles each having traction wheels, of prime movers on the respective vehicles, electric propulsion means for connecting the prime movers to the traction wheels, a multiple unit control system for the electric propulsion means embodying a plurality of controllers on the vehicles adjustable one at a time while the remaining controllers are in "off" position through a range of controlling movement for controlling all of the electric propulsion means, and means operated by an operated controller for changing the speeds of the engines during the aforesaid range of controlling movement of such controller.

In testimony whereof, I have hereunto subscribed my name this 17th day of April, 1928.

HERBERT T. HERR.

CERTIFICATE OF CORRECTION.

Patent No. 1,839,921.  Granted January 5, 1932, to

HERBERT T. HERR.

It is hereby certified that error appears in the printed specification of the above numbered patent requiring correction as follows: Page 11, lines 69, 81 and 96, claims 1, 2 and 3, respectively, strike out the word "connected" and insert the same to follow the word "of" second occurrence, in same lines and claims; and that the said Letters Patent should be read with these corrections therein that the same may conform to the record of the case in the Patent Office.

Signed and sealed this 5th day of April, A. D. 1932.

(Seal)

M. J. Moore,
Acting Commissioner of Patents.